US011913276B2

(12) United States Patent
Morin et al.

(10) Patent No.: US 11,913,276 B2
(45) Date of Patent: Feb. 27, 2024

(54) INSULATED GLAZING UNIT FORMING A DOOR OR WINDOW OPENING PANEL, WHICH IS FRAMELESS OVER AT LEAST A PART OF ITS PERIPHERY

(71) Applicant: SAINT-GOBAIN GLASS FRANCE, Courbevoie (FR)

(72) Inventors: Camille Morin, Paris (FR); Guillaume Marion, Chaleze (FR); Marian Iclazan, Valenii de Munte (RO); Ghenadie Vatamanu, Valenii de Munte (RO)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 415 days.

(21) Appl. No.: 17/291,165

(22) PCT Filed: Nov. 5, 2019

(86) PCT No.: PCT/EP2019/080230

§ 371 (c)(1),
(2) Date: May 4, 2021

(87) PCT Pub. No.: WO2020/094637

PCT Pub. Date: May 14, 2020

(65) Prior Publication Data

US 2022/0074259 A1 Mar. 10, 2022

(30) Foreign Application Priority Data

Nov. 5, 2018 (FR) ...................................... 1860161

(51) Int. Cl.

*E06B 3/66* (2006.01)
*E06B 3/663* (2006.01)

(52) U.S. Cl.

CPC *E06B 3/66333* (2013.01); *E06B 2003/66338* (2013.01)

(58) Field of Classification Search

CPC .................. E06B 3/66333; E06B 2003/66338

(Continued)

(56) References Cited

U.S. PATENT DOCUMENTS 5,156,894 A * 10/1992 Hood ................. E06B 3/66323 52/786.13
5,308,662 A * 5/1994 Woodard ............. E06B 3/6715 52/786.13
2015/0151511 A1* 6/2015 Weiss ........................ B32B 7/05 428/192

FOREIGN PATENT DOCUMENTS

WO WO 2017/036832 A1 3/2017

OTHER PUBLICATIONS

International Search Report as issued in International Patent Application No. PCT/EP2019/080230, dated Nov. 29, 2019.

(Continued)

*Primary Examiner* — Mark R Wendell
(74) *Attorney, Agent, or Firm* — Pillsbury Winthrop Shaw Pittman LLP

(57) ABSTRACT

An insulated glazing unit forming a door or window opening panel, which is frameless over at least a part of its periphery, and which includes at least two glass panes spaced apart one from another by two, left and right, glass vertical spacers disposed respectively in proximity to the left and right edges of the glass panes, and two, top and bottom, horizontal spacers of a material other than glass, disposed respectively in proximity to the top and bottom edges of the glass panes. The insulated glazing unit also includes, between each face of the horizontal spacers that faces toward the outside of the insulated glazing unit and the edge of the glass panes, a (Continued)

metal profile, at least one end of the bottom metal profile being attached at least to the two glass panes by a structural adhesive.

22 Claims, 4 Drawing Sheets

(58) Field of Classification Search
USPC .......................................................... 52/786.1
See application file for complete search history.

(56) References Cited

OTHER PUBLICATIONS

"Product Information," *Dow Corning*®, 3362 HD Insulating Glass Sealant, Apr. 2016, Retrieved from the Internet: URL:http://files.autospec.com/za/abe/new/dow-corning-3362hd.pdf, 4 pages.

* cited by examiner

INSULATED GLAZING UNIT FORMING A DOOR OR WINDOW OPENING PANEL, WHICH IS FRAMELESS OVER AT LEAST A PART OF ITS PERIPHERY

CROSS-REFERENCE TO RELATED APPLICATIONS

This application is the U.S. National Stage of PCT/EP2019/080230, filed Nov. 5, 2019, which in turn claims priority to French patent application number 1860161 filed Nov. 5, 2018. The content of these applications are incorporated herein by reference in their entireties.

The invention concerns an insulated glazing unit forming a door or window opening panel, which is frameless over at least a part of its periphery.

Door or window opening panels are known, the insulated glazing unit whereof is surrounded by a frame that provides mechanical strength thereto.

Now, the trend is to make glazing units lighter and to optimize visibility therethrough. To that end, glazing units are known, particularly for refrigerator doors, with transparent spacers at least on the vertical edges, which are then frameless on those edges. However, the mechanical strength of such glazing units is questionable. Furthermore, such doors or windows can comprise, on the horizontal edges thereof, spacers that are of a different material. The fact of combining two types of spacers of materials that can have rather different mechanical behavior can result in an accumulation of stresses at the boundary between the spacers, and cause a breakage of the insulated glazing unit along the bottom horizontal spacer in the event of impact against the glazing unit.

There is therefore a need for an insulated glazing unit forming a door or window opening panel, which is frameless over at least a part of its periphery, which has good mechanical strength and which withstands impacts in spite of spacers of different materials.

To that end, the invention proposes an insulated glazing unit forming a door or window opening panel, which is frameless over at least a part of its periphery, comprising at least two glass panes spaced apart one from another by two, left and right, glass vertical spacers disposed respectively in proximity to the left and right edges of the glass panes and two, top and bottom, horizontal spacers of a material other than glass disposed respectively in proximity to the top and bottom edges of the glass panes, the insulated glazing unit also comprising, between each face of the horizontal spacers that faces toward the outside of the insulated glazing unit and the edge of the glass panes, a metal profile, at least one end of the bottom metal profile being attached at least to the two glass panes by a structural adhesive.

According to another feature, the structural adhesive attachment means has:

- a Shore D hardness of between 30 and 70, preferably between 40 and or even between 45 and 55, and/or
- a Shore A hardness of between 80 and 100, preferably between 85 and 95, or even between 87 and 93, and/or
- a tensile strength of between 1 and 50 N/mm$^2$, preferably between 1 and 30 N/mm$^2$, or even between 1 and 20 N/mm$^2$, or between 5 and 15 N/mm$^2$, and/or
- an elongation at break of between 50 and 500%, preferably between 100 and 450%, or even between 140 and 400%.

According to another feature, the glass vertical spacers are disposed flush with the vertical edge faces of the glass panes and each of the lateral faces of each vertical spacer is attached to the glass panes with a transparent adhesive attachment means preferably having a function of sealing against water, and even more preferably a function of sealing against water, air, gases and water vapor.

According to another feature, each of the lateral faces of each horizontal spacer is attached to the glass panes with a butyl type adhesive attachment means forming a first barrier seal, preferably against air, gases and water vapor.

According to another feature, the insulated glazing unit further comprises a gasket forming a second barrier seal, preferably against water, of the polyurethane, polysulfide or silicone type, between each face of the horizontal spacers that face toward the outside of the insulated glazing unit and each metal profile, said gasket making it possible to attach each horizontal spacer to the glass panes and to attach each metal profile to the respective spacer and possibly to the glass panes.

According to another feature, the length of the glass vertical spacers is less than the length of the vertical edges of the glass panes and the length of the horizontal spacers is less than the length of the horizontal edges of the glass panes, each end of each glass vertical spacer being partly abutted against an end edge of a horizontal spacer.

According to another feature, each end of each horizontal spacer is coated with the same adhesive attachment means as the lateral edges of said horizontal spacer, a gasket being disposed between each end of each horizontal spacer and the left, respectively right, vertical edge faces of the glass panes.

According to another feature at least one end of the bottom metal profile is coated with structural adhesive over at least three of the faces thereof, two of the faces thereof being those situated facing the glass panes and the third face being the face facing towards the interior of the insulated glazing.

According to another feature, the two ends of the bottom metal profile are coated with structural adhesive.

According to another feature, the full length of the bottom metal profile is coated with structural adhesive.

According to another feature, at least one end of both the bottom and top metal profiles is coated with structural adhesive, said two ends being on the same right or left side.

According to another feature, two ends of the two, bottom and top, metal profiles are coated with structural adhesive.

According to another feature, the full length of the two, bottom and top, metal profiles is coated with structural adhesive.

According to another feature, each bottom and top metal profile is a mechanical reinforcing metal profile.

According to another feature, each bottom and top metal profile is fitted at one end thereof with a pivot pin suitable for being inserted in a pivot hole of a door frame or window frame on which the insulated glazing unit forming an opening panel is intended to be mounted.

According to another feature, when only one end of the bottom metal profile or only one end of both bottom and top metal profiles is(are) coated with structural adhesive, said end(s) is(are) on the side of the insulated glazing unit where the pivot pins are located.

According to another feature, the space delimited by the glass panes, the glass vertical spacers and the horizontal spacers is filled with air or with rare gas such as argon or krypton.

The invention also concerns a climatic cabinet, in particular a positive cold refrigerated cabinet, comprising at least one insulated glazing unit as described above.

The invention also concerns a window or door comprising as opening panel an insulated glazing unit as described above, and a frame on which the opening panel is articulated.

Other features and advantages of the invention will now be described with regard to the drawings in which.

Figure 2:
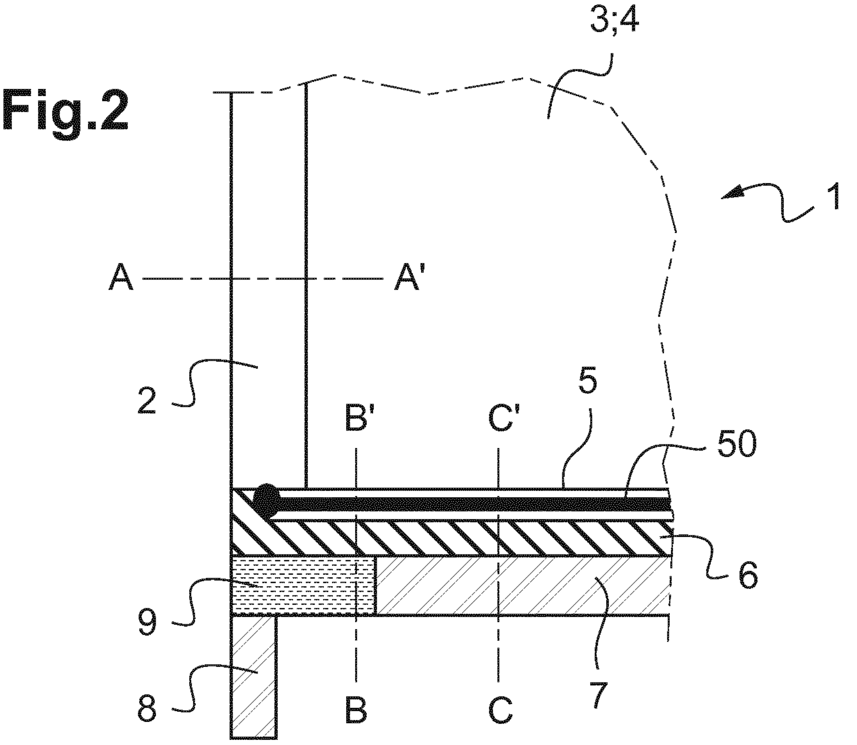
FIG. 2 represents a front detail view of a corner of an insulated glazing unit according to the invention.
Figure 4A:
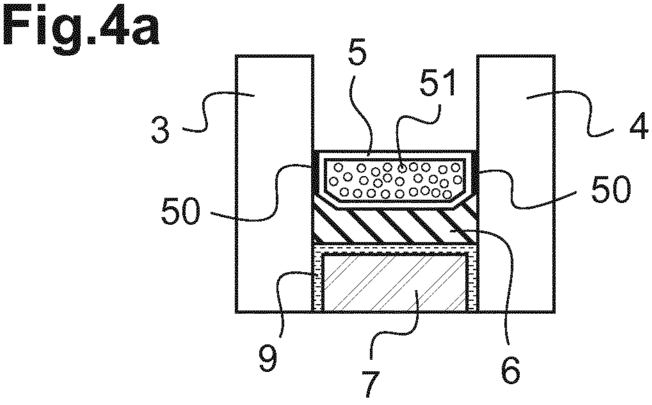
Figure 4B:
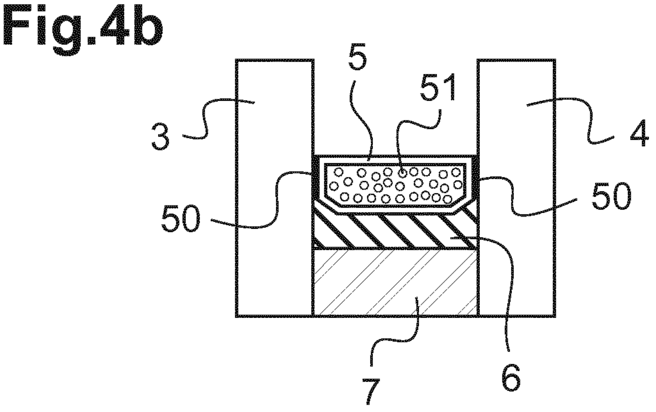
Figure 6:
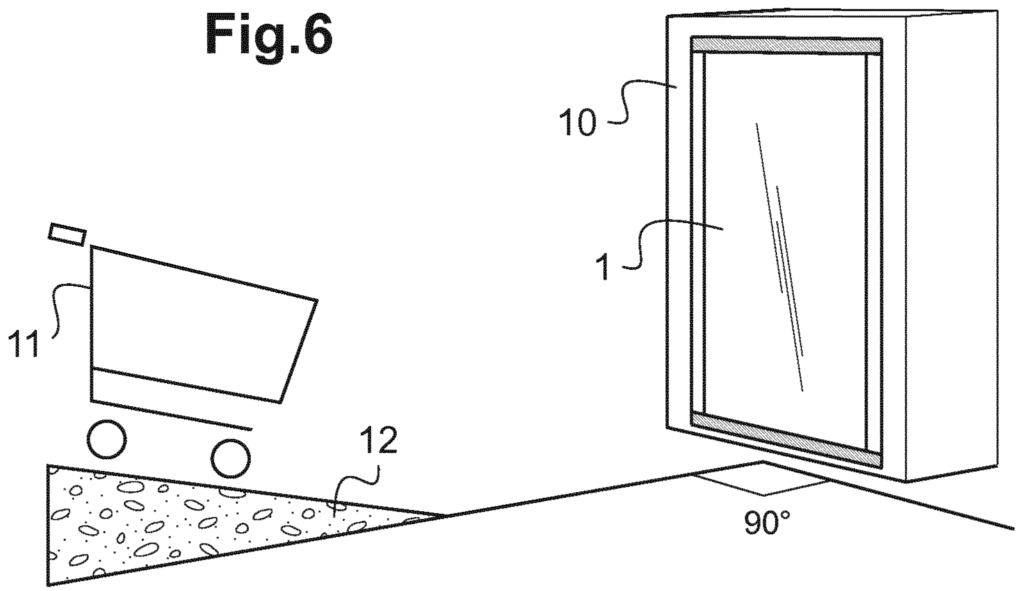
Figure 7:
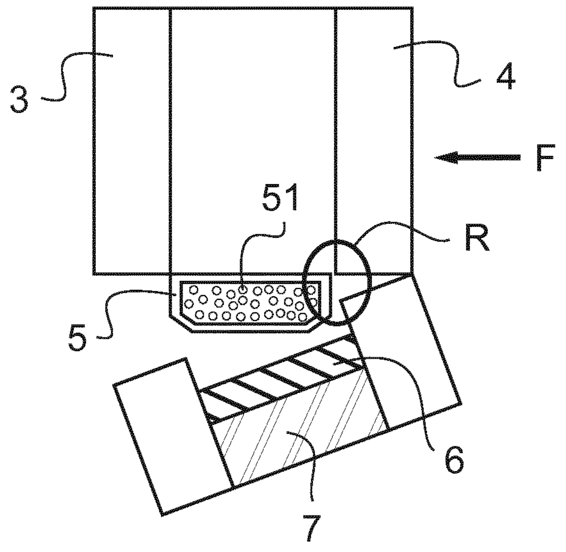

FIGS. 4*a* and 4*b* represent a view in cross section respectively along B-B' and C-C' of FIG. 2 of a horizontal edge of an insulated glazing unit according to the invention;

FIGS. 5*a* to 5*e* represent five possible configurations of coating of the metal profile with a structural adhesive;

FIG. 6 represents a view in perspective of the test performed to test the mechanical strength under frontal impact;

FIG. 7 represents a cross-sectional view of an insulated glazing unit of the prior art with no structural adhesive and which did not withstand the impact of the test according to FIG. 6.

The term "glass pane" should be understood as any transparent substrate having a glass function. It may involve a pane of mineral glass or organic glass.

The term "transparent" should be understood as making it possible to see at least colors and shapes through it, without necessarily being able to read a text behind it. However, the reading of a text and visibility through the transparent spacer is preferred.

The reference numbers that are identical in the different figures represent similar or identical elements.

The invention relates to an insulated glazing unit forming a door or window opening panel, which is frameless over at least a part of its periphery, and which comprises at least two glass panes spaced apart one from another by two, left and right, glass vertical spacers disposed respectively in proximity to the left and right edges of the glass panes, and two top and bottom horizontal spacers of a material other than glass, disposed respectively in proximity to the top and bottom edges of the glass panes. The insulated glazing unit also comprises, between each face of the horizontal spacers that faces towards the outside of the insulated glazing unit and the edge of the glass panes, a metal profile, at least one end of the bottom metal profile being attached at least to the two glass panes by a structural adhesive.

Thus, the metal profile provides rigidity to the insulated glazing, and therefore mechanical strength. Moreover, the structural adhesive makes it possible to provide the rigidity over at least the bottom horizontal edge, and therefore to reinforce at least one corner situated in proximity to the connection between two spacers of different materials, and thus to reinforce resistance to impact in spite of the presence of spacers of different materials.

Figure 1:
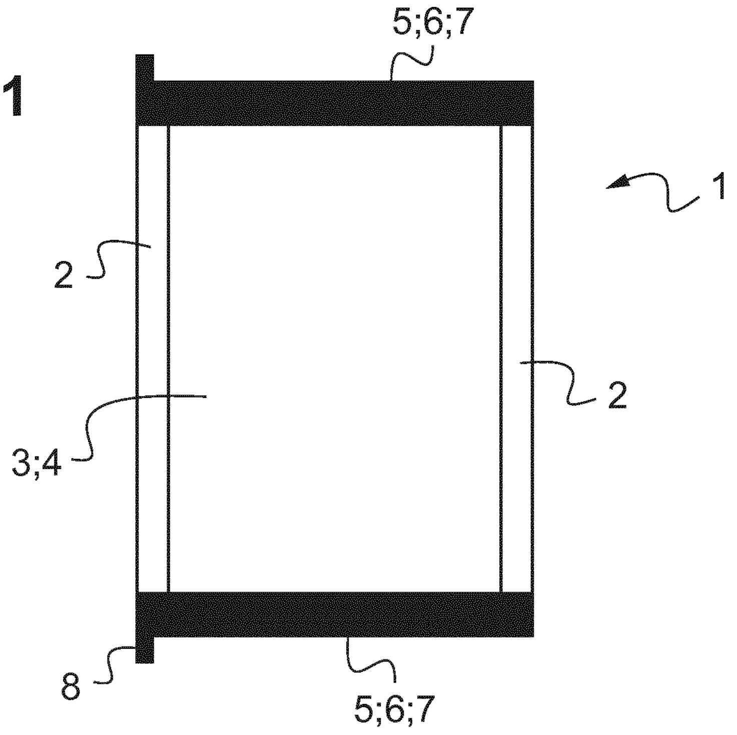
FIG. 1 represents a front view of an insulated glazing unit according to the invention.

FIG. 1 represents a front view of an insulated glazing unit according to the invention;

The insulated glazing unit 1 forms a door or window opening panel. For example, it forms the opening panel of a refrigerated cabinet, for example a positive cold cabinet.

The insulated glazing unit 1 comprises at least two glass panes 3, 4 spaced apart one from another by two glass vertical spacers 2 and two horizontal spacers of a material other than glass. The insulated glazing unit 1 also comprises two pivot pins 8 each suitable for being inserted into a pivot hole of a door or window frame on which the insulated glazing unit 1 forming the opening panel is intended to be mounted. The two pivot pins 8 are preferably situated at the end, respectively, of the two horizontal edges of the insulated glazing unit 1, on the same right or left side.

The insulated glazing unit is which is frameless over at least a part of its periphery, for example at least over both vertical edges. Preferably, the insulated glazing unit 1 is frameless over the entire periphery thereof.

FIG. 2 represents a front detail view of a corner of an insulated glazing unit according to the invention.

The two glass vertical spacers 2 are disposed respectively in proximity to the left and right edges of the glass panes 3, 4: they are referred to as right and left vertical spacers. The two horizontal spacers 5 are disposed respectively in proximity to the top and bottom edges of the glass panes 3, 4: they are referred to as top and bottom horizontal spacers. The space delimited by the glass panes 3, 4 and the vertical and horizontal spacers 2, 5 is filled with air or rare gas such as argon or krypton. The rare gas enables the thermal insulation of the insulated glazing unit to be improved compared to air. The presence of glass spacers on the vertical edges makes it possible to improve the visibility through of the insulated glazing unit since they are transparent. The user of the insulated glazing unit 1, for example a supermarket customer if it is a commercial refrigerator opening panel, is not hindered by the vertical uprights that would prevent them from seeing certain products. A plurality of doors can be mounted flush side by side. The user then sees all the contents of the refrigerators at a glance. The view is not hindered by any vertical upright.

Figure 3:
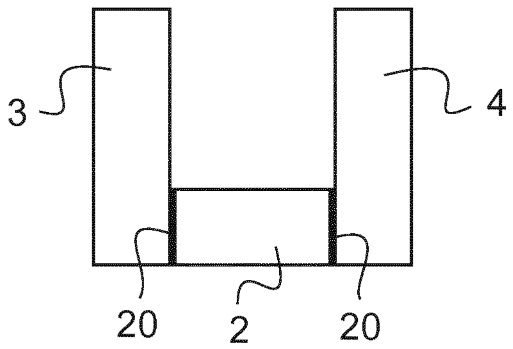
FIG. 3 represents a cross-sectional view along A-A' of FIG. 2 of a vertical edge of an insulated glazing unit according to the invention.

FIG. 3 represents a cross-sectional view along A-A' of FIG. 2 of a vertical edge of an insulated glazing unit according to the invention; The glass vertical spacers 2 are preferably disposed flush with the vertical edge faces of the glass panes 3, 4. Each lateral face of each vertical spacer 2 is attached to one of the glass panes 3, 4 by transparent adhesive attachment means Said transparent adhesive attachment means 20 participates in increasing the visibility therethrough. The transparent adhesive means of attachment 20 preferably has at least a function of sealing against water, and more preferably a function of sealing against water, air, gases and water vapor. The transparent adhesive attachment means 20 is for example a material that cross-links under ultraviolet (UV) or not, preferably quickly (at most a few minutes). For example, it is made of acrylate resin or epoxy resin, such as for example the UV adhesive Verifix LV 740 supplied by the Bohle company, which can be cross-linked under UV.

FIGS. 4*a* and 4*b* represent a cross-sectional view respectively along B-B' and along C-C' of FIG. 2 of a horizontal edge of an insulated glazing unit according to the invention;

Each horizontal spacer 5 consists of a material other than glass. For example, it involves a conventional aluminum interlayer or an interlayer for breaking thermal bridges, called a warm edge, such as for example the interlayer marketed under the brand Swisspacer made of styrene acrylonitrile (SAN) that can be glass fiber reinforced.

Each horizontal spacer 5 is preferably hollow in order to receive the desiccant 51 therein, and it therefore comprises fine grooves on the face thereof oriented towards the interior of the insulated glazing unit allowing the inner space of the insulated glazing unit filled with air or rare gas to be placed in contact with the desiccant, without the desiccant being able to flow in said space.

Each lateral face of each horizontal spacer 5 is attached to one of the glass panes 3, 4 by adhesive attachment means 50, which constitutes a first barrier seal, preferably against air, gases and water vapor, such as for example butyl.

The insulated glazing unit 1 also comprises, between the two glass panes 3, 4, and between each face of the horizontal spacers 5 that faces toward the outside of the insulated glazing unit 1 and the edge of the glass panes 3, 4, a metal profile 7. The insulated glazing unit 1 therefore comprises two metal profiles 7, respectively disposed on the top and bottom edges of the insulated glazing unit 1. Each metal profile 7 is a mechanical reinforcing metal profile and it enables the mechanical strength of the insulated glazing unit 1 to be improved. The metal profiles 7 are preferably disposed flush with the horizontal edge faces of the glass panes 3, 4. Each metal profile 7 has a length substantially equal to the length of the horizontal edges of the glass panes 3, 4.

Each top and bottom profile 7 is fitted at one end thereof with a pivot pin capable of being inserted in a pivot hole of a door frame or window frame on which the insulated glazing unit forming an opening panel is intended to be mounted. The two pivot pins 8 are situated on the same side, right or left, of the insulated glazing unit 1.

Between each face of the horizontal spacers 5 that faces toward the outside of the insulated glazing unit 1 and the metal profile 7, the insulated glazing unit further comprises a gasket 6, forming a second barrier seal, preferably against water, such as for example polyurethane, polysulfide or silicone.

The gasket 6 makes it possible to attach each horizontal spacer 5 to the glass panes 3, 4 and to attach each mechanical reinforcement profile to the respective spacer and possibly to the glass panes if the gasket 6 flows between the lateral faces of said metal profile 7.

Furthermore, as represented in particular in FIG. 2, the length of the glass vertical spacers 2 is less than the length of the vertical edges of the glass panes 3, 4 and the length of the horizontal spacers 5 is less than the length of the horizontal edges of the glass panes 3, 4. Each end of each glass vertical spacer 2 is then partly abutted against one end edge of a horizontal spacer 5 in order to form a closed spacer frame, formed from all four vertical and horizontal spacers 2, 5.

In order to reinforce the sealing of the spacer frame, each end of each horizontal spacer 5 is coated with the same adhesive attachment means 50 as the lateral edges of said horizontal spacer 5. Furthermore, some gasket material 6 is disposed between the ends of each horizontal spacer 5 and the left and right vertical edge faces of the glass panes 3, 4. Thus, the insulated glazing unit 5 comprises two barrier seals 50, 6 at the end of each horizontal spacer 5 as for the rest of said horizontal spacer 5.

Moreover, as represented in particular in FIGS. 2 and 4*a*, the insulated glazing unit 1 comprises a structural adhesive on at least one end of the bottom metal profile 7. Said structural adhesive makes it possible to adhere at least said end of the bottom metal profile 7 to the two glass panes. Preferably, the structural adhesive is also present on the face of the bottom metal profile 7 oriented towards the interior of the insulated glazing unit 1, which makes it possible to further bond said end of the bottom metal profile 7 to the gasket 6.

The structural adhesive is an adhesive having the function of contributing rigidity to the insulated glazing unit in order to improve the mechanical strength and impact resistance thereof. The structural adhesive is preferably in the form of a thixotropic paste that hardens at ambient temperature in a few minutes.

Also, the structural adhesive 9 has for example a Shore D hardness of between 30 and 70, preferably between 40 and 60, or even between 45 and 55 in order to further improve the mechanical strength. The structural adhesive 9 has for example a Shore A hardness of between 85 and 100, preferably between 85 and or even between 87 and 93 in order to further improve the mechanical strength. The structural adhesive 9 has for example a tensile strength of between 1 and NI/mm$^2$, preferably between 1 and 30 NI/mm$^2$, even between 1 and 20 NI/mm$^2$, or even between 5 and 15 NI/mm$^2$ in order to further improve the mechanical strength. The structural adhesive 9 for example has an elongation at break of between 50 and 500%, preferably between 100 and 450%, or even between 140 and 400% in order to further improve the mechanical strength. Said four parameters are to be considered alone or in combination of at least two.

FIGS. 5*a* to 5*e* represent five possible configurations of coating of the metal profile with a structural adhesive. To facilitate reading, in FIGS. 5*a* to 5*e* only the metal profiles 7 and the structural adhesive 9 are shown on the horizontal edges.

Figure 5A:
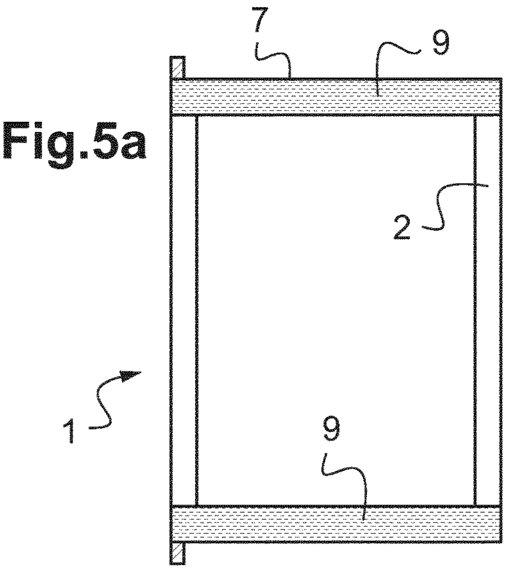
Figure 5B:
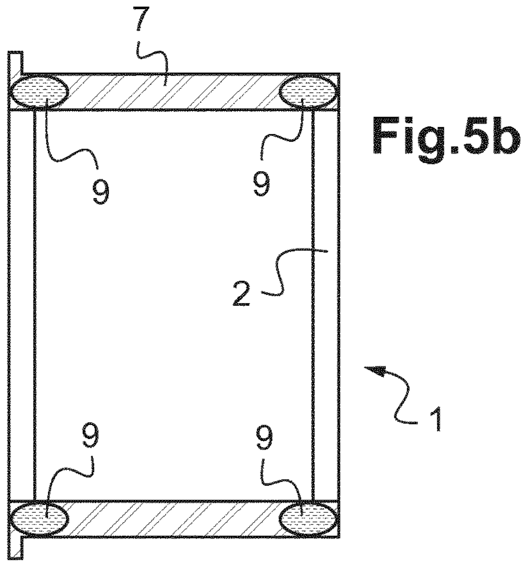
Figure 5C:
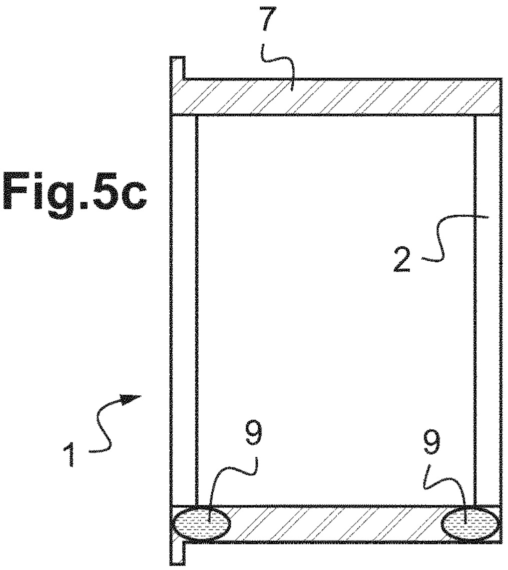
Figure 5D:
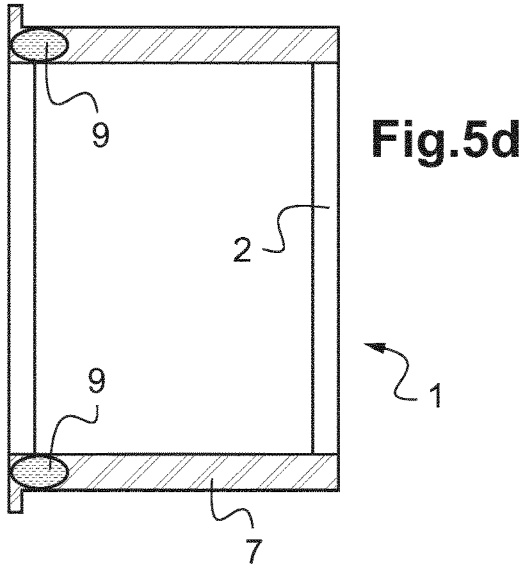
Figure 5E:
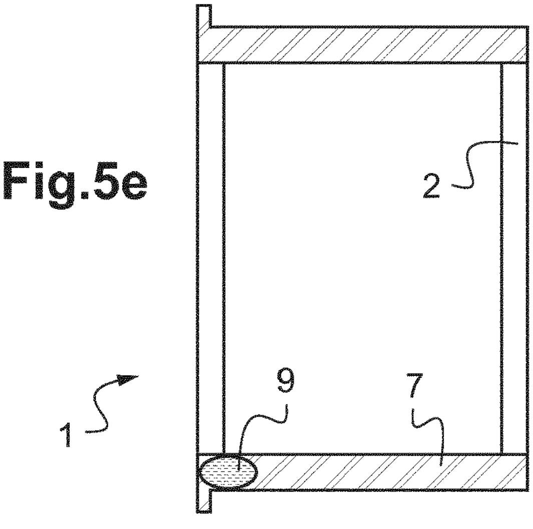

In the configuration of FIG. 5*e*, only the end of the bottom metal profile 7 situated in proximity to the pivot pin 8 is coated with structural adhesive 9. The coating of said end is of a few centimeters, preferably between 1 and 10 cm, more preferably between 1 and 5 cm, or even between 2 and 4 cm.

In the configuration of FIG. 5*c*, both ends of the bottom metal profile 7 are coated with structural adhesive 9.

In one configuration not shown, the full length of the bottom metal profile 7 is coated with structural adhesive 9.

In the configuration of FIG. 5*d*, the end of both the bottom and top metal profiles 7 is coated with structural adhesive 9, said two ends being on the same side right or left and situated in proximity to the pivot pin 8.

In the configuration of FIG. 5*b*, both ends of the two, bottom and top, metal profiles 7 are coated with structural adhesive 9.

In the configuration of FIG. 5*a*, the full length of the two, bottom and top, metal profiles 7 is coated with structural adhesive 9.

In order to test the mechanical impact strength performance of these different configurations, a test was carried out.

FIG. 6 represents a view in perspective of the test performed to test the mechanical strength under frontal impact.

The insulated glazing unit 1 is mounted on a refrigeration cabinet 10. A supermarket cart having an unladen weight of 20 kg descends a slope of 5° over 50 cm, perpendicular to the insulated glazing. The test is performed with the cart empty, then by adding 10 kg to each test up to a total of 100 kg (20 kg cart+80 kg load). Three identical tests were performed for each configuration.

For these tests, the insulated glazing unit 1 comprises two glass panes 3, 4 of tempered glass 4 mm thick, spaced 16 mm apart. The transparent adhesive attachment means 20 is the UV adhesive Verifix LV740. The horizontal spacers 5 are aluminum, the adhesive means 50 is butyl and the gasket 6 is of polyurethane. The structural adhesive 9 has a Shore A hardness of 90, a Shore D hardness of 50, a tensile strength of 10 N/mm$^2$ and an elongation at break of 150%.

A first test was carried out on an insulated glazing unit of the prior art with no structural adhesive: all the glazing units were broken with the empty cart. FIG. 7 shows a cross-sectional view of such an insulated glazing unit having no structural adhesive and which did not withstand the impact of the test according to FIG. 6. The arrow F designates the direction of the cart before impact. R designates the area of breakage due to the accumulation of stresses. The tested insulated glazing unit of the prior art comprises two glass panes of tempered glass 4 mm thick, spaced 16 mm apart, two glass vertical spacers bonded to the glass panes with the UV adhesive Verifix LV740, two aluminum horizontal spacers bonded to the glass panes by butyl, with a polyurethane gasket.

The remainder of the tests were concerned with all the configurations represented in FIGS. 5*a* to 5*e* as well as the configuration not shown, described above: all of these insulated glazing unit configurations according to the invention made it possible to withstand a total load of at least 40 kg, i.e. a cart with a load of kg. The structural adhesive therefore plays an essential role in the mechanical strength of the insulated glazing unit according to the invention.

The insulated glazing unit according to the configuration of FIG. 5*a* passed the test up to a total of 100 kg. The insulated glazing unit according to the configuration not shown (structural adhesive over the full length of the bottom metal profile 7) passed the test up to a total of 100 kg. Two out of three glazing units according to the configurations of FIGS. 5*c* and 5*e* also passed the test up to a total of 100 kg. The least effective configuration is the one in FIG. 5*d*.

The structural adhesive 9 is therefore preferably disposed only at the bottom metal profile, at least over its end situated beside the pivot pin 8. Even more preferably, the structural adhesive is disposed on both ends of the bottom metal profile, or over the full length of the bottom metal profile, even over the full length of both the bottom and top metal profiles.

Sealing tests were also carried out: the insulated glazing unit is also effective with the addition of the structural adhesive on the metal profile.

The insulated glazing unit 1 according to the invention, with no frame around the periphery thereof but provided with top and bottom metal profiles, with at least the end of the bottom metal profile situated in proximity to the pivot pin being coated with structural adhesive 9, therefore makes it possible to improve the mechanical strength of the insulated glazing unit and the impact resistance thereof, with no loss in terms of sealing.

The insulated glazing unit can be integrated into a climatic cabinet, in particular a positive cold refrigerator cabinet. The invention therefore also concerns a climatic cabinet, in particular a positive cold refrigerated cabinet, comprising at least one insulated glazing unit 1.

The invention also concerns a window or door comprising as opening panel an insulated glazing unit 1, and a frame on which the insulated glazing unit 1 is articulated.

The invention claimed is:

1. An insulated glazing unit forming a door or window opening panel, which is frameless over at least a part of its periphery, comprising at least two glass panes spaced apart one from another by two, left and right, glass vertical spacers disposed respectively in proximity to left and right edges of the at least two glass panes and two, top and bottom, horizontal spacers of a material other than glass disposed respectively in proximity to top and bottom edges of the at least two glass panes, the insulated glazing unit also comprising, between each face of the two, top and bottom, horizontal spacers that faces toward an outside of the insulated glazing unit and, respectively, the top and bottom edges of the at least two glass panes, a top and a bottom metal profile, at least one end of the bottom metal profile being attached at least to the at least two glass panes by a structural adhesive, wherein the structural adhesive is arranged between each of the at least two glass panes and the at least one end of the bottom metal profile and is out of contact with the face of the bottom horizontal spacer that faces toward the outside of the insulated glazing unit.

2. The insulated glazing unit as claimed in claim 1, wherein the structural adhesive has:

a Shore D hardness of between 30 and 70, and/or a Shore A hardness of between 80 and 100, and/or a tensile strength of between 1 and 50 N/mm$^2$, and/or an elongation at break of between 50 and 500%.

3. The insulated glazing unit as claimed in claim 2, wherein the structural adhesive has:

a Shore D hardness of between 40 and 60, and/or a Shore A hardness of between 85 and 95, and/or a tensile strength of between 1 and 30 N/mm$^2$, and/or an elongation at break of between 100 and 450%.

4. The insulated glazing unit as claimed in claim 1, wherein the vertical glass spacers are disposed flush with vertical edge faces of the at least two glass panes and each of lateral faces of each vertical glass spacer is attached to the at least two glass panes with a transparent adhesive attachment means.

5. The insulated glazing unit as claimed in claim 1, wherein each of lateral faces of each horizontal spacer is attached to the at least two glass panes with a butyl type adhesive attachment means forming a first barrier seal.

6. The insulated glazing unit as claimed in claim 1, further comprising a gasket forming a second barrier seal of polyurethane, polysulfide or silicone, between each face of the horizontal spacers that faces toward the outside of the insulated glazing unit and each of the top and the bottom metal profile, said gasket making it possible to attach each horizontal spacer to the at least two glass panes and to attach each the top and the bottom metal profile to the respective horizontal spacer and possibly to the at least two glass panes.

7. The insulated glazing unit as claimed in claim 1, wherein a length of the glass vertical spacers is less than a length of vertical edges of the at least two glass panes and a length of the horizontal spacers is less than a length of horizontal edges of the at least two glass panes, each end of each glass vertical spacer being partly abutted against an end edge of a horizontal spacer.

8. The insulated glazing unit as claimed in claim 1, wherein each end of each horizontal spacer is coated with the same adhesive attachment means as the lateral edges of said horizontal spacer, a gasket being disposed between each end of each horizontal spacer and the left, respectively right, vertical edge faces of the at least two glass panes.

9. The insulated glazing unit as claimed in claim 1, wherein at least one end of the bottom metal profile is coated with structural adhesive over at least three of its faces, two of its faces being those situated facing the at least two glass panes and a third face being the face facing toward an interior of the insulated glazing unit.

10. The insulated glazing unit as claimed in claim 1, wherein two ends of the bottom metal profile are coated with structural adhesive.

11. The insulated glazing unit as claimed in claim 1, wherein a full length of the bottom metal profile is coated with structural adhesive.

12. The insulated glazing unit as claimed in claim 1, wherein at least one end of both the bottom and top metal profiles is coated with structural adhesive, said two ends being on the same right or left side.

13. The insulated glazing unit as claimed in claim 1, wherein two ends of the bottom and top metal profiles are coated with structural adhesive.

14. The insulated glazing unit as claimed in claim 1, wherein a full length of the two, bottom and top, metal profiles is coated with structural adhesive.

15. The insulated glazing unit as claimed in claim 1, wherein each of the bottom and top metal profiles is a mechanically reinforcing metal profile.

16. The insulated glazing unit as claimed in claim 1, wherein each bottom and top metal profile is fitted at one of its ends with a pivot pin suitable for being inserted in a pivot hole of a door frame or window frame on which the insulated glazing unit forming an opening panel is intended to be mounted.

17. The insulated glazing unit as claimed in claim 15, wherein at least one end of both the bottom and top metal profiles is coated with structural adhesive, said two ends being on the same right or left side, and wherein, when only one end of the bottom metal profile or only one end of both bottom and top metal profiles is(are) coated with structural adhesive, said end(s) is(are) on a side of the insulated glazing unit where the pivot pins are located.

18. The insulated glazing unit as claimed in claim 1, wherein the space delimited by the at least two glass panes, the glass vertical spacers and the horizontal spacers is filled with air or with rare gas such as argon or krypton.

19. A climatic cabinet comprising at least one insulated glazing unit as claimed in claim 1.

20. A window or door comprising as opening panel an insulated glazing unit as claimed in claim 1, and a frame on which the opening panel is articulated.

21. The insulated glazing unit as claimed in claim 1, further comprising a gasket that extends between the bottom horizontal spacer and the metal frame.

22. The insulated glazing unit as claimed in claim 21, wherein the structural adhesive covers part of a face of the bottom metal frame oriented towards an interior of the insulated glazing such that the structural adhesive is arranged between said part of the face of the bottom metal frame and bottom horizontal spacer and the face of the bottom horizontal spacer is out of contact with the gasket.

* * * * *